(12) United States Patent
Bittner et al.

(10) Patent No.: US 12,704,460 B2
(45) Date of Patent: Aug. 11, 2026

(54) FILTER SET, FLUORESCENCE OBSERVATION SYSTEM AND METHOD FOR SIMULTANEOUSLY OBSERVING FLUORESCENT AND NON-FLUORESCENT REGIONS OF AN OBJECT

(71) Applicant: Carl Zeiss Meditec AG, Jena (DE)

(72) Inventors: Christian Bittner, Roehlingen (DE); Christian Beder, Aalen (DE)

(73) Assignee: Carl Zeiss Meditec AG, Jena (DE)

( * ) Notice: Subject to any disclaimer, the term of this patent is extended or adjusted under 35 U.S.C. 154(b) by 408 days.

(21) Appl. No.: 17/448,496

(22) Filed: Sep. 22, 2021

(65) Prior Publication Data

US 2022/0091039 A1 Mar. 24, 2022

(30) Foreign Application Priority Data

Sep. 22, 2020 (DE) ......................... 102020124686.2

(51) Int. Cl.

*G01N 21/64* (2006.01)
*G02B 21/06* (2006.01)
*G02B 21/16* (2006.01)

(52) U.S. Cl.

CPC ..... *G01N 21/6458* (2013.01); *G01N 21/6456* (2013.01); *G02B 21/06* (2013.01); *G02B 21/16* (2013.01); *G01N 2021/6471* (2013.01)

(58) Field of Classification Search

CPC .................. G01N 21/6456; G01N 2021/6471
See application file for complete search history.

(56) References Cited

U.S. PATENT DOCUMENTS 4,768,513 A * 9/1988 Suzuki ................. A61B 5/0075 356/73
5,590,660 A 1/1997 MacAulay et al.
(Continued)

FOREIGN PATENT DOCUMENTS

DE 19548913 A1 7/1997
DE 10339784 A1 8/2003
DE 10201005 B4 3/2007
DE 69837839 T2 12/2007
(Continued)

OTHER PUBLICATIONS

German Office Action for German Patent Application No. 10 2020 124 686.2, dated Jul. 7, 2021, (16 pages), German Patent and Trademark Office, Munich, Germany.
(Continued)

*Primary Examiner* — Uzma Alam
*Assistant Examiner* — Shun Lee
(74) *Attorney, Agent, or Firm* — Alston & Bird LLP

(57) ABSTRACT

The present invention relates to a filter set, to a fluorescence observation system and to a method for simultaneously observing fluorescent and non-fluorescent regions of an object. The filter set comprises an illumination filter and an observation filter. The illumination filter is configured such that it efficiently transmits visible light having short wavelengths and efficiently blocks light having a long wavelength. The observation filter is configured such that it efficiently blocks visible light having short wavelengths and efficiently transmits light having a long wavelength. The illumination filter and the observation filter are configured such that the product of the transmittance of the illumination filter $T^I(\lambda)$ and the transmittance of the observation filter $T^O(\lambda)$ are very constant over a high proportion of the visible wavelength range.

12 Claims, 2 Drawing Sheets

(56) References Cited

U.S. PATENT DOCUMENTS

Figure 1:
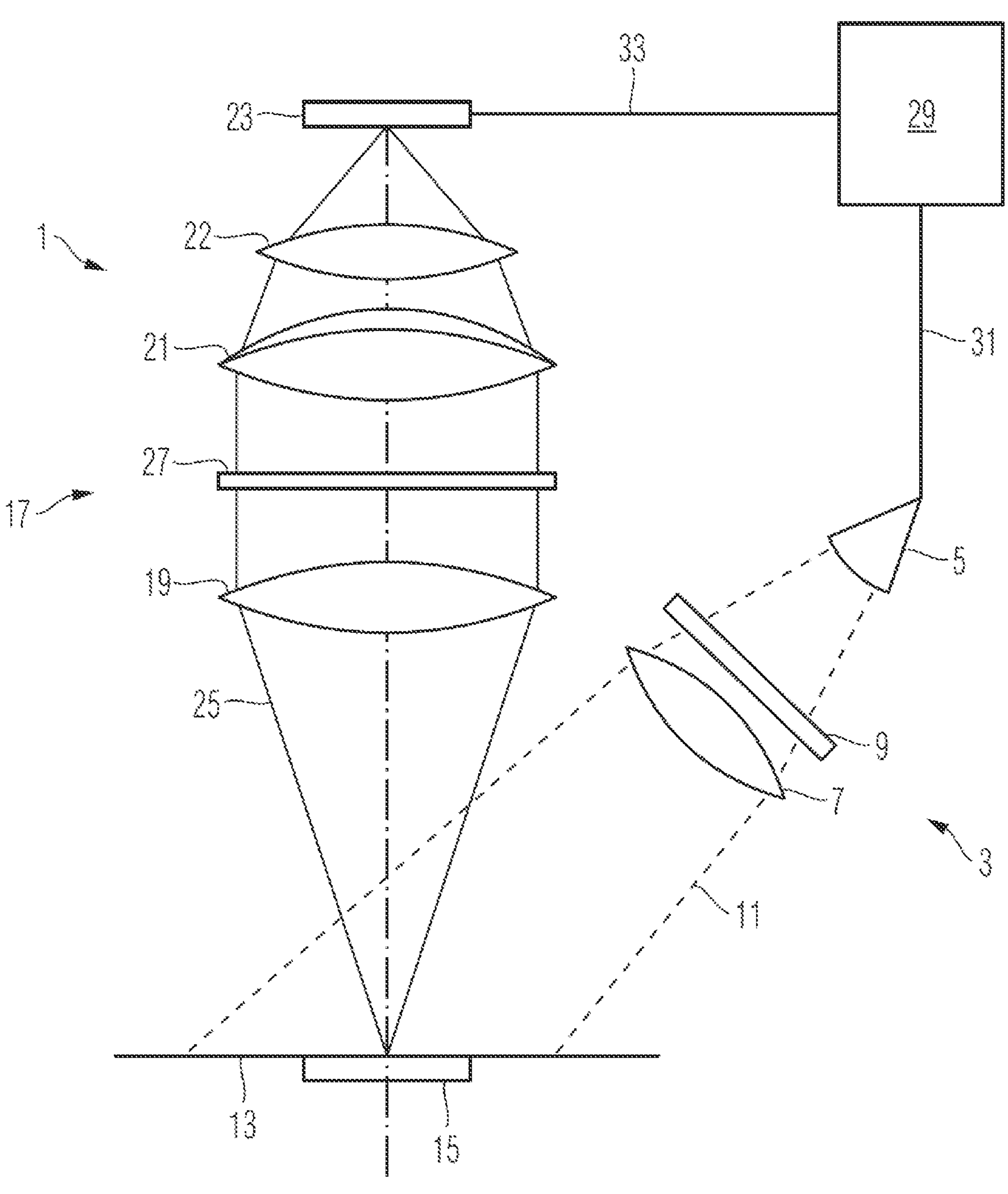

| | | | | |
|---|---|---|---|---|
| 6,212,425 | B1 * | 4/2001 | Irion | A61B 5/0084 600/476 |
| 6,640,131 | B1 | 10/2003 | Irion et al. | |
| 8,040,599 | B2 | 10/2011 | Steffen et al. | |
| 9,901,253 | B2 | 2/2018 | Ishihara | |
| 10,182,709 | B2 | 1/2019 | Fengler et al. | |
| 2002/0089658 | A1 | 7/2002 | Seville | |
| 2003/0227674 | A1 | 12/2003 | Nihoshi et al. | |
| 2004/0109231 | A1 | 6/2004 | Haisch et al. | |
| 2007/0165235 | A1 | 7/2007 | Haridas | |
| 2010/0044583 | A1 | 2/2010 | Steffen et al. | |
| 2011/0149084 | A1 | 6/2011 | Beck et al. | |
| 2012/0057226 | A1 | 3/2012 | Kuster | |
| 2012/0248333 | A1 | 10/2012 | Fallert et al. | |
| 2012/0300294 | A1 | 11/2012 | Jess et al. | |
| 2013/0307953 | A1 * | 11/2013 | Hauger | A61B 5/0071 382/128 |
| 2016/0139391 | A1 | 5/2016 | Hauger et al. | |
| 2018/0180477 | A1 * | 6/2018 | Nieten | G02B 21/16 |
| 2018/0252909 | A1 | 9/2018 | Regensburger et al. | |
| 2019/0353596 | A1 | 11/2019 | Wilzbach et al. | |
| 2020/0240918 | A1 | 7/2020 | Wilzbach et al. | |

FOREIGN PATENT DOCUMENTS

| | | | |
|---|---|---|---|
| DE | 102008034008 | A1 | 1/2010 |
| DE | 102008045671 | A1 | 3/2010 |
| DE | 102010033285 | A1 | 4/2011 |
| DE | 102009058663 | A1 | 6/2011 |
| DE | 102010044503 | A1 | 3/2012 |
| DE | 102011016138 | A1 | 10/2012 |
| DE | 102014016850 | A1 | 5/2016 |
| DE | 102015011441 | A1 | 3/2017 |
| DE | 102018114695 | B3 | 8/2019 |
| EP | 0930843 | B1 | 2/2004 |
| JP | H11-511369 | A | 10/1999 |
| JP | 2006-526428 | A | 11/2006 |
| JP | 2009-525495 | A | 7/2009 |
| JP | 2014-087661 | A | 5/2014 |
| JP | 2019-200208 | A | 11/2019 |
| WO | WO-2007/085496 | A1 | 8/2007 |
| WO | WO 2015/080215 | A1 | 3/2017 |

OTHER PUBLICATIONS

Japanese Application No. 2021-153554, Office Action mailed Jul. 26, 2022.

* cited by examiner

Protoporphyrin IX (PpIX)

I
1
0
405nm
A
635nm
E
705nm
400
500
600
700
800
λ(nm)

$T^I$
37
$10^0$
$10^{-1}$
$10^{-2}$
$10^{-3}$
$10^{-4}$
$10^{-5}$
W1
W2
400
$\lambda_1$
$\lambda_2$
700
800
λ(nm)

$T^O$
39
$10^0$
$10^{-1}$
$10^{-2}$
$10^{-3}$
$10^{-4}$
$10^{-5}$
W1
W2
400
$\lambda_1$
$\lambda_2$
700
800
λ(nm)

$T^I \cdot T^O$
41
$10^{-4}$
$10^{-5}$
$10^{-6}$
$10^{-7}$
$10^{-8}$
$10^{-9}$
400
$\lambda_1$
$\lambda_2$
700
800
λ(nm)

FILTER SET, FLUORESCENCE OBSERVATION SYSTEM AND METHOD FOR SIMULTANEOUSLY OBSERVING FLUORESCENT AND NON-FLUORESCENT REGIONS OF AN OBJECT

This application claims priority to German Patent Application DE 102020124686.2, filed Sep. 22, 2020, the content of which is hereby incorporated by reference in its entirety.

The present invention relates to a filter set, to a fluorescence observation system and to a method for simultaneously observing fluorescent and non-fluorescent regions of an object. The filter set, the fluorescence observation system and the method are suitable in particular for fluorescent dyes having an absorption spectrum and emission spectrum in the visible wavelength range between 380 nm and 780 nm.

Fluorescence observation is used in many fields of technology, biology and medicine to make different types of structures of an object visible in a manner distinguishable from one another. Typically, an illumination filter is arranged in a beam path between an illumination light source and the object to be observed, and an observation filter is arranged between the object to be observed and an observer (for example eye, image detector).

In conventional filter sets, the illumination filter allows substantially only light to pass that can excite the fluorescence of a fluorescent dye. The observation filter is arranged in a beam path of an observation optical unit, which observation filter allows fluorescent light to pass and substantially does not allow light to pass that the illumination filter allows to pass. In an image that is perceived directly by the eye looking into the observation optical unit or that is recorded by an image detector via the observation optical unit, fluorescent structures of the object are then perceptible as bright regions, while non-fluorescent structures of the object are dark. Accordingly, fluorescent and non-fluorescent regions of the object cannot be observed simultaneously.

In some fields, for example in the field of tumour detection, it is desirable for the non-fluorescent regions of the object also to be perceptible in the image in order to thereby be able to better capture the spatial position of the fluorescent structures relative to the non-fluorescent structures. A filter set having a corresponding property is described for example in DE 195 48 913 A1. However, this filter set does not offer any approximately colour fidelity reproduction. DE 10 2010 033 825 A1 discloses a further filter set with which fluorescent and non-fluorescent regions of an object can be observed simultaneously. In addition, the filter set offers approximately colour fidelity reproduction. For this purpose, a plurality of wavelength ranges with high transmission, which are matched to one another and are, in part, relatively narrowband, are provided both in the illumination filter and in the observation filter. Such filters are difficult and expensive to produce due to the complex wavelength-dependent transmittance.

Accordingly, it is an object of the present invention to propose a filter set, a fluorescence observation system and a method for carrying out a fluorescence observation, which allow observation of fluorescent and non-fluorescent regions of an object with maximum colour fidelity using filters that are easy and inexpensive to produce.

The object is achieved by a filter set comprising an illumination filter and an observation filter, wherein the average value of $T^I(\lambda)$ over a first wavelength range from a wavelength $\lambda_{VIS,MIN}$ up to a wavelength $\lambda_1$ is greater than a first value W1; wherein the average value of $T^I(\lambda)$ over a second wavelength range from a wavelength $\lambda_2$ up to a wavelength $\lambda_{VIS,MAX}$ is smaller than a second value W2; wherein the average value of $T^O(\lambda)$ over the first wavelength range is smaller than the second value W2; wherein the average value of $T^O(\lambda)$ over the second wavelength range is greater than the first value W1; wherein the average value of $$\left|\log_{10}\left(\frac{T^I(\lambda)\cdot T^O(\lambda)}{\mu_{WLB3}}\right)\right|$$

over a third wavelength range, which is the combination of the first and the second wavelength ranges, is smaller than a third value W3, wherein $\mu_{WLB3}$ is the average value of $T^I(\lambda)\cdot T^O(\lambda)$ over the third wavelength range; wherein $T^I(\lambda)$ is the wavelength-dependent transmittance of the illumination filter, wherein $T^O(\lambda)$ is the wavelength-dependent transmittance of the observation filter; wherein $\lambda_{VIS,MIN}<\lambda_1<\lambda_2<\lambda_{VIS,MAX}$, $\lambda_{VIS,MIN}$=380 nm and $\lambda_{VIS,MAX}$=780 nm; wherein W1>100·W2; and wherein W3<1.5.

The object is further achieved by a fluorescence observation system comprising: an illumination system having a light source for illuminating an object, an observation system for imaging the object, and the filter set, wherein the illumination filter of the filter set is arranged in an illumination beam path between the light source and the object and the observation filter of the filter set is arranged in a beam path of the observation system.

The object is further achieved by a method comprising: filtering an illumination light beam, which is directed onto an object, using the illumination filter of the filter set; and filtering light emanating from the object using the observation filter of the filter set.

The proposed filter set comprises the illumination filter. The illumination filter is designed as a low-pass filter for visible light, that is to say a large proportion of light having a short wavelength is transmitted through the illumination filter, whereas a large proportion of light having a longer wavelength is not transmitted through the illumination filter.

In the first wavelength range, extending from $\lambda_{VIS,MIN}$=380 nm to $\lambda_1$, the illumination filter has a high transmittance, as a result of which a large proportion of light having a short wavelength can be transmitted through the illumination filter. In the second wavelength range, extending from $\lambda_2$ to $\lambda_{VIS,MAX}$=780 nm, the illumination filter has a low transmittance, as a result of which a large proportion of light having a long wavelength cannot be transmitted through the illumination filter. This is expressed by W1>100·W2, wherein W1 represents a lower limit for the average value of $T^I(\lambda)$ over the first wavelength range and W2 represents an upper limit for the average value of $T^I(\lambda)$ over the second wavelength range. In the wavelength range from $\lambda_1$ to $\lambda_2$, which is referred to as the fourth wavelength range, the transmittance of the illumination filter transitions from a large value (or large average value) in the first wavelength range to a small value (or small average value) in the second wavelength range.

The proposed filter set furthermore comprises the observation filter. The observation filter is designed as a high-pass filter for visible light, that is to say a large proportion of light having a short wavelength is not transmitted through the observation filter, whereas a large proportion of light having a longer wavelength is transmitted through the observation filter. In the first wavelength range, the observation filter has a low transmittance, as a result of which a large proportion of light having a short wavelength cannot be transmitted through the observation filter. In the second wavelength range, the observation filter has a high transmittance, as a result of which a large proportion of light having a long wavelength can be transmitted through the observation filter. This is expressed by $W1>100\cdot W2$, wherein W1 represents an upper limit for the average value of $T^O(\lambda)$ over the first wavelength range and W2 represents a lower limit for the average value of $T^O(\lambda)$ over the second wavelength range. In the fourth wavelength range from $\lambda_1$ to $\lambda_2$, the transmittance of the observation filter transitions from a small value (or small average value) in the first wavelength range to a large value (or large average value) in the second wavelength range.

The transmittance of the illumination filter and of the observation filter are matched to one another such that the first and the second wavelength ranges lie in the wavelength range that is visible for human beings and do not overlap, which is expressed by $\lambda_{VIS,MIN}<\lambda_1<\lambda_2<\lambda_{VIS,MAX}$.

The third wavelength range is defined as the combination of the first and the second wavelength ranges. Accordingly, the third wavelength range extends from $\lambda_{VIS,MIN}=380$ nm to $\lambda_{VIS,MAX}=780$ nm without the fourth wavelength range from $\lambda_1$ to $\lambda_2$. The product of the transmittance of the illumination filter and the transmittance of the observation filter (i.e. $T^I(\lambda)\cdot T^O(\lambda)$) is as constant as possible over the entire third wavelength range. This is achieved by the transmittance of the illumination filter $T^I(\lambda)$ and the transmittance of the observation filter $T^O(\lambda)$ being suitably matched to one another over the third wavelength range. This is expressed by the fact that the average value of $$\Delta(\lambda) = \left|\log_{10}\left(\frac{T^I(\lambda)\cdot T^O(\lambda)}{\mu_{WLB3}}\right)\right|$$

over the third wavelength range is smaller than the third value W3, wherein $W3<1.5$.

$\Delta(\lambda)$ is a measure of the deviation of the product $T^I(\lambda)\cdot T^O(\lambda)$ at the wavelength $\lambda$ from $\mu_{WLB3}$, the average value of the product $T^I(\lambda)\cdot T^O(\lambda)$ over the third wavelength range. Accordingly, $\Delta(\lambda)$ is a measure of the local deviation at the wavelength $\lambda$. The average value of $\Delta(\lambda)$ over the third wavelength range is a measure of the global deviation within the third wavelength range. The smaller the average value of $\Delta(\lambda)$ over the third wavelength range is, the more constant is the product $T^I(\lambda)\cdot T^O(\lambda)$ over the third wavelength range. The average value can be calculated, for example as an arithmetic mean over the wavelength $\lambda$.

Using the above-described filter set, the following effects are achieved. It is assumed here that the wavelengths $\lambda_1$ and $\lambda_2$ have been selected such that at least a portion of the absorption spectrum of a fluorescent dye lies in the first wavelength range and at least a portion of the emission spectrum of the fluorescent dye lies in the second wavelength range.

It is an effect of the high transmittance of the illumination filter in the first wavelength range to efficiently transmit illumination light for exciting the fluorescent dye, as a result of which the fluorescent dye can emit fluorescent light. The fluorescent light is efficiently transmitted due to the high transmittance of the observation filter.

Owing to the separation of the first and second wavelength ranges by the fourth wavelength range, there is no wavelength range within the visible wavelength range in which both the illumination filter and the observation filter have a high transmittance. Therefore, the fluorescent light is not overexposed by light that is transmitted by the illumination filter, is reflected at the object, and is then transmitted through the observation filter. For this reason, the fluorescent light can be observed well.

A further effect of the filter set arises from the interaction of the illumination filter and the observation filter. The product $T^I(\lambda)\cdot T^O(\lambda)$ of the transmittances is approximately constant over the third wavelength range, which comprises a high proportion of the entire visible wavelength range. That means that the intensity of light that is transmitted through the illumination filter, is reflected at the object and is then transmitted through the observation filter is attenuated over the third wavelength range at an approximately constant factor. This in turn means that the object can be observed with colour fidelity.

The attenuation of the intensity of the light reflected at the object can be set with respect to the fluorescence efficiency. For example, the intensity of light that serves for exciting the fluorescent dye is greater by a factor of 100 to 1000 than the intensity of the fluorescent light that is produced thereby. Since the intensity of the light reflected at the object is attenuated by the filter set by a comparable or even greater factor, the light that is transmitted through the filter set and reflected at the object does not overexpose the fluorescent light, with the result that fluorescent regions of the object can be observed simultaneously with non-fluorescent regions of the object.

The wavelength-dependent transmittance $T(\lambda)$ of an optical filter is, as usual, defined as the ratio between the intensity of light of the wavelength $\lambda$ that is transmitted through the optical filter to the intensity of light of the wavelength $\lambda$ that is incident on the optical filter.

The optical filters disclosed herein are relatively easy to produce. Numerous different types of optical filters are known. One example is interference filters, which provide specific optical properties by means of a stack of layers of different materials. It is known that the details of a stack (material selection, thicknesses of the individual layers, etc.) can be calculated by means of simulation programs, wherein the desired optical properties are input as boundary conditions into the simulation program. Numerous simulation programs with different functions are in existence. One such simulation program is the commercially available "OptiLayer Thin Film Software" by OptiLayer GmbH, Watzmannring 71, 85748 Garching near Munich. It is known that interference filters can be produced, for example, by "sputtering". For example, Chroma Technology Corp, 10 Imtec Lane, Bellows Falls, VT 05101 USA produces optical filters in this way.

Figures 2A, 2B, 2C, 2D:
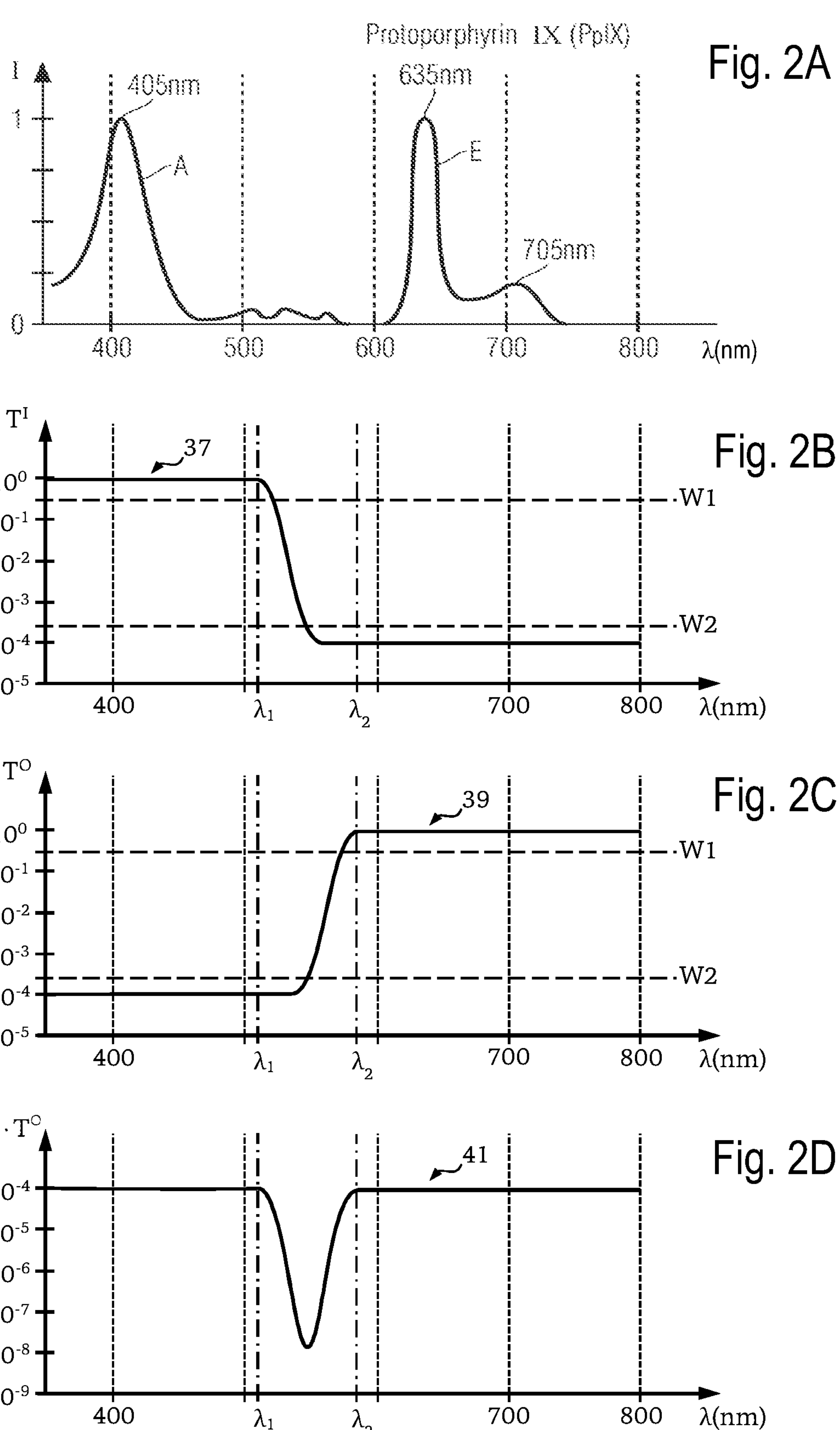

Embodiments of the invention are explained in greater detail below with reference to figures, in which:

FIG. 1 shows a fluorescence observation system according to an embodiment of the invention, FIG. 2A shows the absorption spectrum and the emission spectrum of an exemplary fluorescent dye, FIG. 2B shows the wavelength-dependent transmittance of an illumination filter of a filter set according to one embodiment of the invention, FIG. 2C shows the wavelength-dependent transmittance of an observation filter of the filter set, FIG. 2D shows the product of the transmittance of the illumination filter, shown in FIG. 2B, and the transmittance of the observation filter, shown in FIG. 2C.

FIG. 1 shows an embodiment of a fluorescence observation system 1. The fluorescence observation system 1 comprises an illumination system 3, which comprises at least one light source 5 and one illumination optical unit 7. The at least one light source 5 may comprise a plurality of different light sources so as to be able to produce illumination light. The illumination system 3 provides, by way of the illumination optical unit 7, an illumination beam path 11, with which illumination light can be directed onto an object region 13. The light produced by the light source 5 is, for example, white light.

Arranged in the beam path 11 is an illumination filter 9 of a filter set, through which the illumination light produced by the illumination system 3 is filtered. As shown in FIG. 1, the illumination filter 9 may be arranged within the illumination system 3. However, the illumination filter 9 can also be arranged outside the illumination system 3. Furthermore, the illumination filter 9 can optionally be inserted into the beam path 11 and be guided out of the beam path 11, for example using an actuator (not illustrated in FIG. 1).

An object 15, which may contain a fluorescent dye, in particular protoporphyrin IX (PpIX), fluorescein or the like, can be arranged in the object region 13. The absorption spectrum and the emission spectrum of the fluorescent dye can lie in the wavelength range that is visible to human beings.

The fluorescent dye in the object 15 can be excited by the illumination light that is filtered using the illumination filter 9, as a result of which the fluorescent dye emits fluorescent light. Furthermore, the illumination light that is filtered using the illumination filter 9 and is incident on the object 15 is at least partially reflected by the latter. Light emanating from the object 15 therefore comprises both fluorescent light and reflected illumination light.

The light emanating from the object 15 is detected by an observation system 17. By way of example, the observation system 17 may comprise a lens 19, a zoom system consisting of the lens elements 21 and 22, and a spatially resolving camera 23. An observation filter 27 of the filter set is arranged in a beam path 25 between the object region 13 and the camera 23.

The fluorescence observation system 1 may further comprise a controller 29 which is connected, firstly, to the illumination system 3 via a connection 31 and, secondly, to the camera 23 via a connection 33. The controller 29 can control the illumination system 3 via the connection 31. By way of example, the controller 29 may control the emission intensity of the at least one light source 5 or control the individual light sources 5 and/or switch these on and off. If a plurality of illumination filters 9 are provided in a filter changer, in particular a filter wheel, the controller 29 can select the illumination filter to be inserted into the beam path 11 and can cause said illumination filter to be introduced into the beam path 11.

The controller 29 receives the images detected by the camera 23 via the connection 33. The controller 29 can process the received images and prompt the presentation thereof on a display device. By way of example, a screen or other image-presenting devices may be considered as a display device.

As an alternative or in addition to the camera 23, an eyepiece may be provided, with which an observer can directly observe the image of the object 15 produced by the observation system 17. For this purpose, a further beam path can be branched off from the beam path 25, which further beam path is guided to the eyepiece or the camera 23.

FIGS. 2A to 2D are used to explain an embodiment of a filter set that is suitable for observing the fluorescent dye PpIX. The concept of the filter set described herein, however, can be applied to further fluorescent dyes, in particular to fluorescent dyes having an absorption spectrum and emission spectrum that each lies at least partially in the visible wavelength range from $\lambda_{VIS,MIN}$=380 nm to $\lambda_{VIS,MAX}$=780 nm.

FIG. 2A shows the absorption spectrum (A) and the emission spectrum (E) of the fluorescent dye PpIX. The absorption spectrum (A) of the fluorescent dye PpIX has a maximum at approximately 405 nm. The emission spectrum (E) has a main maximum at approximately 635 nm and a secondary maximum at approximately 705 nm. The absorption spectrum (A) and the emission spectrum (E) are normalized to its respective maximum absorption and emission.

FIG. 2B shows the wavelength-dependent transmittance of the illumination filter 9, abbreviated to $T^I(\lambda)$, as a graph 37. The abscissa represents the wavelength λ in nanometres (nm). The ordinate represents the transmittance with a logarithmic scale. The transmittance $T^I(\lambda)$ of the illumination filter 9 is approximately 1 from $\lambda_{VIS,MIN}$=380 nm to $\lambda_1$≈510 nm, decreases continuously from $\lambda_1$≈510 nm to $\lambda_2$≈580 nm to approximately $10^{-4}$ and from $\lambda_2$≈580 nm to $\lambda_{VIS,MAX}$=780 nm is approximately $10^{-4}$.

FIG. 2C shows the wavelength-dependent transmittance of the observation filter 27, abbreviated to $T^O(\lambda)$, as a graph 39. The abscissa represents the wavelength λ in nanometres (nm). The ordinate represents the transmittance with a logarithmic scale. The transmittance $T^O(\lambda)$ of the observation filter 27 from $\lambda_{VIS,MIN}$=380 nm to $\lambda_1$≈510 nm is approximately $10^{-4}$, increases continuously from $\lambda_1$≈510 nm to $\lambda_2$≈580 nm to approximately 1 and from $\lambda_2$≈580 nm to $\lambda_{VIS,MAX}$=780 nm is approximately 1.

FIG. 2D shows the product of the wavelength-dependent transmittance of the illumination filter 9 and the wavelength-dependent transmittance of the observation filter 27, abbreviated to $T^I(\lambda)\cdot T^O(\lambda)$, as a graph 41. The abscissa represents the wavelength λ in nanometres (nm). The ordinate represents the product with a logarithmic scale. The product $T^I(\lambda)\cdot T^O(\lambda)$ from $\lambda_{VIS,MIN}$=380 nm to $\lambda_1$≈510 nm is approximately $10^{-4}$, decreases from $\lambda_1$≈510 nm to approximately $10^{-8}$, then increases up to $\lambda_2$≈580 nm to approximately $10^{-4}$ and from $\lambda_2$≈580 nm to $\lambda_{VIS,MAX}$=780 nm is approximately $10^{-4}$.

The wavelength range from $\lambda_{VIS,MIN}$=380 nm to $\lambda_1$≈510 nm is denoted as the first wavelength range. The average value of $T^I(\lambda)$ over the first wavelength range is greater than a first value W1, which is a lower limit for the average value of $T^I(\lambda)$ over the first wavelength range. The average value of $T^O(\lambda)$ over the first wavelength range is smaller than the second value W2, which is an upper limit for the average value of $T^O(\lambda)$ over the first wavelength range. To sufficiently suppress reflected illumination light of the first wavelength range: W1>100·W2, in particular W1>200·W2 or W1>500·W2 or W1>1000·W2 or W1>10 000·W2 or W1>100 000·W2. With preference: W1≥0.1, in particular W1≥0.5, more particularly W1≥0.9. With preference: W2≤0.05, in particular W2≤0.01, more particularly W2≤0.005.

The wavelength range from $\lambda_2$≈580 nm to $\lambda_{VIS,MAX}$=780 nm us debited as the second wavelength range. The average value of $T^I(\lambda)$ over the second wavelength range is smaller than the second value W2, which is an upper limit for the average value of $T^I(\lambda)$ over the second wavelength range. The average value from $T^O(\lambda)$ over the second wavelength range is greater than the first value W1, which is a lower limit for the average value of $T^O(\lambda)$ over the second wavelength range.

The combination of the first and second wavelength ranges is denoted as the third wavelength range. The wavelength range from $\lambda_1$≈510 nm to $\lambda_2$≈580 nm is denoted as the fourth wavelength range. The product $T^I(\lambda)\cdot T^O(\lambda)$ in the fourth wavelength range has significantly smaller values than in the third wavelength range. The fourth wavelength range serves for separating the region of high transmission of the illumination filter in the first wavelength range from the region of high transmission of the observation filter in the second wavelength range. This avoids overexposure of the fluorescent light.

To ensure that the object 15 can be observed with the greatest colour fidelity, $T^I(\lambda)$ and $T^O(\lambda)$ in the third wavelength range are matched to one another such that the product $T^I(\lambda)\cdot T^O(\lambda)$ in the third wavelength range is as constant as possible. This is achieved for example by the average value of $$\left|\log_{10}\left(\frac{T^I(\lambda)\cdot T^O(\lambda)}{\mu_{WLB3}}\right)\right|$$

over the third wavelength range being smaller than a third value W3, wherein $\mu_{WLB3}$ is the average value of $T^I(\lambda)\cdot T^O(\lambda)$ over the third wavelength range and W3<1.5. The expression restricts a factor that is the ratio of the product $T^I(\lambda)\cdot T^O(\lambda)$ to $\mu_{WLB3}$ on average to an upper limit of a maximum of $10^{1.5}$. The smaller the value of the expression is, the more constant is the product $T^I(\lambda)\cdot T^O(\lambda)$ in the third wavelength range round the value $\mu_{WLB3}$. With preference: W3<1.0, in particular W3<0.7, more particularly W3<0.4. With further preference: W3<0.1 or W3<0.05 or W3<0.01 or W3<0.001.

Alternatively or additionally, the constancy of the product $T^I(\lambda)\cdot T^O(\lambda)$ in the third wavelength range can be expressed in that $$\left|\log_{10}\left(\frac{T^I(\lambda)\cdot T^O(\lambda)}{\mu_{WLB3}}\right)\right| \leq W4$$

for each wavelength $\lambda$ within the third wavelength range with W4=1.5. The expression means that there must not be any wavelength within the third wavelength range at which $T^I(\lambda)\cdot T^O(\lambda)>10^{W4}\cdot\mu_{WLB3}$ or $T^I(\lambda)\cdot T^O(\lambda)<10^{-W4}\cdot\mu_{WLB3}$ is met. Preferably: W4=1.0 or W4=0.7 or W4=0.1 or W4=0.05 or W4=0.01.

According to one exemplary embodiment, $T^I(\lambda)$ and $T^O(\lambda)$ are matched to one another such that: $\mu_{WLB3}>0.00001$, in particular $\mu_{WLB3}>0.0001$, more particularly $\mu_{WLB3}>0.0005$, wherein $\mu_{WLB3}$ is the average value of $T^I(\lambda)\cdot T^O(\lambda)$ over the third wavelength range. This ensures that light that is transmitted through the illumination filter 9, reflected at the object 15 and then transmitted through the observation filter 27 has an intensity that is large enough to be able to be observed. The intensity lies in the region of the intensity of fluorescent light, which means that fluorescent regions of the object 15 and non-fluorescent regions of the object 15 can be perceived with similar intensity.

According to one exemplary embodiment, $T^I(\lambda)$ and $T^O(\lambda)$ are matched to one another such that: $\mu_{WLB3}<0.01$, in particular $\mu_{WLB3}<0.001$. This ensures that light that is transmitted through the illumination filter 9, reflected at the object 15 and then transmitted through the observation filter 27 has an intensity that is small enough to not overexpose fluorescent light.

According to one exemplary embodiment, $T^I(\lambda)$ and $T^O(\lambda)$ are matched to one another such that: $|\lambda_1-\lambda_2|\leq 100$ nm, in particular $|\lambda_1-\lambda_2|\leq 50$ nm, more particularly $|\lambda_1-\lambda_2|\leq 30$ nm and/or $|\lambda_1-\lambda_2|\geq 10$ nm, in particular $|\lambda_1-\lambda_2|\geq 20$ nm, more particularly $|\lambda_1-\lambda_2|\geq 30$ nm. The smaller the distance between $\lambda_1$ and $\lambda_2$ is, the better the colour fidelity with which the object 15 can be observed, because the third wavelength range comprises a larger bandwidth. If the distance between $\lambda_1$ and $\lambda_2$ is very small, the production may be more difficult. With the ranges stated, the filters are easy to produce and still offer good colour fidelity. In addition, with a larger distance it is easier to ensure that the wavelength range in which the illumination filter has a high transmission and the wavelength range in which the observation filter has a high transmission do not overlap.

According to one exemplary embodiment, $T^I(\lambda)$ and $T^O(\lambda)$ are matched to one another such that: $\mu_{WLB3}>K1\cdot\mu_{WLB4}$ with K1=10, wherein $\mu_{WLB3}$ is the average value of $T^I(\lambda)\cdot T^O(\lambda)$ over the third wavelength range and $\mu_{WLB4}$ is the average value of $T^I(\lambda)\cdot T^O(\lambda)$ over the fourth wavelength range from the wavelength $\lambda_1$ up to the wavelength $\lambda_2$. This ensures that the product $T^I(\lambda)\cdot T^O(\lambda)$ within the fourth wavelength range is sufficiently smaller than the product $T^I(\lambda)\cdot T^O(\lambda)$ within the third wavelength range. With preference: K1=100 or K1=1000 or K1=10 000 or K1=100 000.

According to an exemplary embodiment, $T^I(\lambda)$ and $T^O(\lambda)$ are matched to one another such that for each wavelength $\lambda$ within the fourth wavelength range: $K2\cdot\mu_{WLB3}>T^I(\lambda)\cdot T^O(\lambda)$ with K2=1.5, in particular K2=1.1, more particularly K2=1.0. This ensures that the product $T^I(\lambda)\cdot T^O(\lambda)$ within the fourth wavelength range is sufficiently smaller than the product $T^I(\lambda)\cdot T^O(\lambda)$ within the third wavelength range.

The concept of the filter set was explained above using the example of PpIX. For application with PpIX, the wavelengths $\lambda_1$ and $\lambda_2$ can be selected for example from the following ranges: 400 nm$\leq\lambda_1\leq$650 nm, in particular 420 nm$\leq\lambda_1\leq$600 nm; $\lambda_2\leq$650 nm, in particular $\lambda_2\leq$600 nm.

For application with fluorescein, the wavelengths $\lambda_1$ and $\lambda_2$ can be selected for example from the following ranges: 450 nm$\leq\lambda_1\leq$510 nm, in particular 470 nm$\leq\lambda_1\leq$510 nm; $\lambda_2\leq$530 nm, in particular $\lambda_2\leq$600 nm.

The invention claimed is:

1. Filter set for simultaneously observing fluorescent and non-fluorescent regions of an object, comprising:

an illumination filter and an observation filter;

wherein the average value of $T^I(\lambda)$ over a first wavelength range from a wavelength $\lambda_{VIS,MIN}$ up to a wavelength $\lambda_1$ is greater than a first value W1;

wherein the average value of $T^I(\lambda)$ over a second wavelength range from a wavelength $\lambda_2$ up to a wavelength $\lambda_{VIS,MAX}$ is smaller than a second value W2;

wherein the average value of $T^O(\lambda)$ over the first wavelength range is smaller than the second value W2;

wherein the average value of $T^O(\lambda)$ over the second wavelength range is greater than the first value W1;

wherein the average value of $$\left|\log_{10}\left(\frac{T^I(\lambda)\cdot T^O(\lambda)}{\mu_{WLB3}}\right)\right|$$

over a third wavelength range, which is a union of the first and the second wavelength ranges, is smaller than a third value W3 so that the object is observable with the color fidelity, wherein $\mu_{WLB3}$ is the average of $T^I(\lambda)\cdot T^O(\lambda)$ over the third wavelength range;

wherein $T^I(\lambda)$ is the wavelength-dependent transmittance of the illumination filter, wherein $T^O(\lambda)$ is the wavelength-dependent transmittance of the observation filter;

wherein $\lambda_{VIS,MIN}<\lambda_1<\lambda_2<\lambda_{VIS,MAX}$, $\lambda_{VIS,MIN}$=380 nm and $\lambda_{VIS,MAX}$=780 nm;

wherein W1>100·W2;

wherein W3<1.5;

wherein $\mu_{WLB3}>K1\cdot\mu_{WLB4}$ with K1=10, is the average value of $T^I(\lambda)\cdot T^O(\lambda)$ over a fourth wavelength range from the wavelength $\lambda_1$ up to the wavelength $\lambda_2$.

2. Filter set according to claim 1, wherein W3<1.0.

3. Filter set according to claim 1, wherein $$\left|\log_{10}\left(\frac{T^I(\lambda)\cdot T^O(\lambda)}{\mu_{WLB3}}\right)\right| \le W4$$

for each wavelength $\lambda$ within the third wavelength range with W4=1.5.

4. Filter set according to claim 1, wherein $\mu_{WLB3}$>0.00001; and/or wherein $\mu_{WLB3}$>0.01.

5. Filter set according to claim 1, wherein $|\lambda_1-\lambda_2|\le 100$ nm; and/or wherein $|\lambda_1-\lambda_2|\ge 10$ nm.

6. Filter set according to claim 1, wherein $K2\cdot\mu_{WLB3}>T^I(\lambda)\cdot T^O(\lambda)$ for each wavelength $\lambda$ within a fifth wavelength range from the wavelength $\lambda_1$ up to the wavelength $\lambda_2$ with K2=1.5.

7. Filter set according to claim 1, wherein W1>200·W2.

8. Filter set according to claim 1, wherein W1≥0.1; and/or wherein W2≤0.05.

9. Filter set according to claim 1, wherein the use of the filter set for protoporphyrin IX;

400 nm≤$\lambda_1$≤650 nm and $\lambda_2$≤650 nm.

10. Filter set according to claim 1, wherein for us of the filter set for fluorescein:

450 nm≤$\lambda_1$≤510 nm and $\lambda_2$≤530 nm.

11. Fluorescence observation system for simultaneously observing fluorescent and non-fluorescent regions of an object, comprising:

an illumination system having a light source for illuminating the object;

an observation system for imaging the object; and a filter set comprising an illumination filter and an observation filter, wherein the average value of $T^I(\lambda)$ over a first wavelength range from a wavelength $\lambda_{VIS,MAX}$ up to a wavelength $\lambda_1$ is greater than a first value W1;

wherein the average value of $T^I(\lambda)$ over a second wavelength range from a wavelength $\lambda_2$ up to a wavelength $\lambda_{VIS,MAX}$ is smaller than a second value W2;

wherein the average value of $T^O(\lambda)$ over the first wavelength range is smaller than the second value W2;

wherein the average value of $T^O(\lambda)$ over the second wavelength range is greater than the first value W1;

wherein the average value of $$\left|\log_{10}\left(\frac{T^I(\lambda)\cdot T^O(\lambda)}{\mu_{WLB3}}\right)\right|$$

over a third wavelength range, which is a union of the first and the second wavelength ranges, is smaller than a third value W3 so that the object is observable with color fidelity, wherein $\mu_{WLB3}$ is the average value of $T^I(\lambda)\cdot T^O(\lambda)$ over the third wavelength range;

wherein $T^I(\lambda)$ is the wavelength-dependent transmittance of the illumination filter, wherein $T^O(\lambda)$ is the wavelength-dependent transmittance of the observation filter;

wherein $\lambda_{VIS,MIN}<\lambda_1<\lambda_2<\lambda_{VIS,MAX}$, $\lambda_{VIS,MIN}$=380 nm and $\lambda_{VIS,MAX}$=780 nm;

wherein W1>100·W2;

wherein W3<1.5;

wherein $\mu_{WLB3}>K1\cdot\mu_{WLB4}$ with K1=10, wherein $\mu_{WLB4}$ is the average value of $T^I(\lambda)\cdot T^O(\lambda)$ over a fourth wavelength range from the wavelength $\lambda_1$ up to the wavelength $\lambda_2$; and wherein the illumination filter of the filter set is arranged in an illumination beam path between the light source and the object and the observation filter of the filter set is arranged in an observation beam path of the observation system.

12. Method for simultaneously observing fluorescent and non-fluorescent regions of an object using a filter set, wherein the method comprises:

filtering an illumination light beam, which is directed onto the object, using an illumination filter of the filter set; and filtering light emanating from the object using an observation filter of the filter set, wherein the average value of $T^I(\lambda)$ over a first wavelength range from a wavelength $\lambda_{VIS,MIN}$ up to a wavelength $\lambda_1$ is greater than a first value W1;

wherein the average value of $T^I(\lambda)$ over a second wavelength range from a wavelength $\lambda_2$ up to a wavelength $\lambda_{VIS,MAX}$ is smaller than a second value W2;

wherein the average value of $T^O(\lambda)$ over the first wavelength range is smaller than the second value W2;

wherein the average value of $T^O(\lambda)$ over the second wavelength range is greater than the first value W1;

wherein the average value of $$\left|\log_{10}\left(\frac{T^I(\lambda)\cdot T^O(\lambda)}{\mu_{WLB3}}\right)\right|$$

over a third wavelength range, which is a union of the first and the second wavelength ranges, is smaller than a third value W3 so that the object is observable with color fidelity, wherein $\mu_{WLB3}$ is the average value of $T^I(\lambda)\cdot T^O(\lambda)$ over the third wavelength range;

wherein $T^I(\lambda)$ is the wavelength-dependent transmittance of the illumination filter, wherein $T^O(\lambda)$ is the wavelength-dependent transmittance of the observation filter;

wherein $\lambda_{VIS,MIN}<\lambda_1<\lambda_2<\lambda_{VIS,MAX}$, $\lambda_{VIS,MIN}$=380 nm and $\lambda_{VIS,MAX}$=780 nm;

wherein W1>100·W2;

wherein W3<1.5; and wherein $\mu_{WLB3}>K1\cdot\mu_{WLB4}$ with K1=10, wherein $\mu_{WLB4}$ is the average value of $T^I(\lambda)\cdot T^O(\lambda)$ over a fourth wavelength range from the wavelength $\lambda_1$ up to the wavelength $\lambda_2$.

* * * * *